United States Patent Office 3,027,991
Patented Apr. 3, 1962

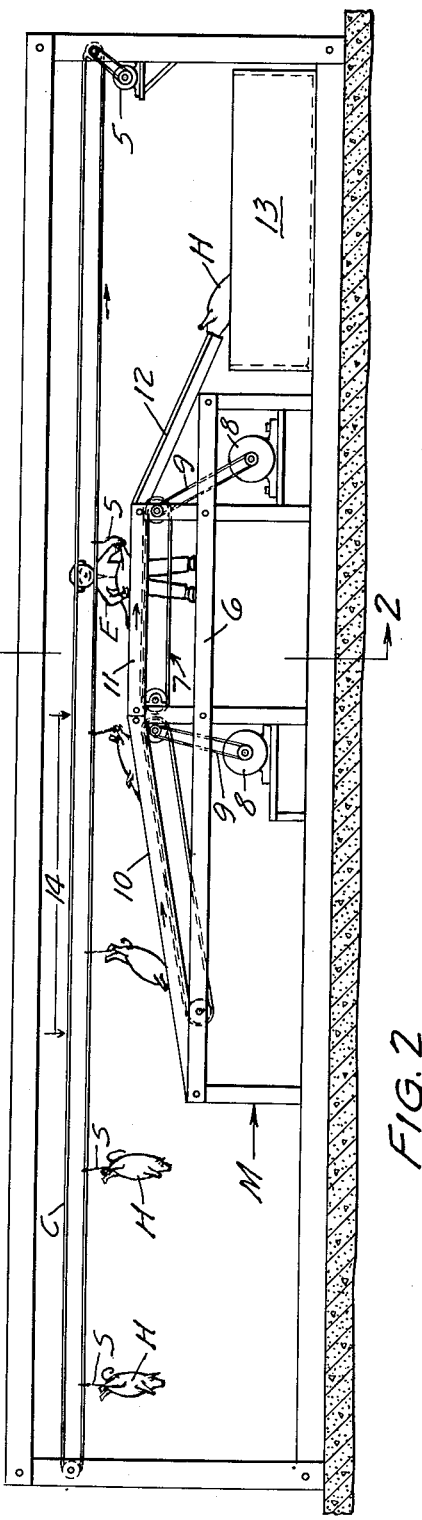

3,027,991
HOG HANDLING DEVICE
Leslie L. Flaherty, Rte. 2, Austin, Minn.
Filed Nov. 3, 1958, Ser. No. 771,534
3 Claims. (Cl. 198—76)

This invention relates to hog handling apparatus. More particularly, it relates to apparatus for use in removing the shackles from shackled hogs in a meat packing plant while the hogs are being conveyed to the scalding tank.

In meat packing plants, hogs are conventionally moved from the location at which they are stuck or bled to the scalding tank by means for overhead conveyors which are constructed to suspended and progress the hogs along the length of the conveyor to a point above the scalding tank or in sufficient proximity thereto so that when released from the shackle, the hog will proceed into the tank. The conventional means for releasing the hog from its shackle has been to employ a hook member mounted on an eccentric which when turned causes the hook member to engage the shackle and jerk it free of the rear leg of the hog by which the latter has been suspended. In so doing, the hog is permitted to slip into the scalding tank. I have found, however, that it is this jerking action which is primarily responsible for much of the damage which is caused to the hams of the hog and especially to the ham of the leg by means of which the hog has been suspended. Such damage causes the ham involved to be rejected insofar as edibility and consumer sales purposes are concerned. My invention is directed towards eliminating or at least substantially reducing the substantial losses heretofore incurred by meat packers from such damage.

I have found that while the hogs are suspended, each by means of a shackle connected to a rear leg of the hog, these hogs bounce and sway as they progress along the overhead conveyor from which they are suspended. Such bouncing and swaying tends to cause the capsules surrounding the pelvic bone and the other joint to act much like pumps in that they tend to draw blood into their interiors when a sudden strain or jerk is imposed upon the leg and tend to force some of this blood into the veins of the meat to cause them to distend and remain filled with blood when the strain upon the capsule is released. The worst jerk of all, of course, to which these capsules are subjected is from one resulting from the shackle being torn free from the hog's leg by the eccentrically mounted hook member.

I have found that in many instances the pelvic capsule is broken by the jerk to which the suspending leg is subjected when the shackle is torn free therefrom in this manner, with the result that substantial quantities of blood escapes the capsule and passes outwardly into the meat of the ham. If the capsule is not broken, this jerk causes sufficient quantities of the blood to be forced outwardly into the veins of the ham which present an unsightly appearance when the ham is cut after having been cooked. Since such a ham is much less desirable, the sales value thereof is greatly reduced. Thus, it is clear that in any event, serious damage to the value of the ham results from this jerking action. If the capsule is broken, this means that the employees, upon inspecting the ham, must cut out that portion of the ham and utilize the same in the manufacture of tankage which provides a much smaller margin of profit than if the ham could be canned or sold as a No. 1 ham. If the amount of meat within which the blood spreads is substantial, the entire ham is lost insofar as canning purposes are concerned and the remaining good portion must be utilized in the preparation of sausage and luncheon meat. The blood permeated portion must be discarded for tankage. This constitutes a serious loss in value of the ham. I have found in my work that if this jerking action can be eliminated, a susbtantial saving will be effected in the number of hams which must be rejected because of the presence of blood throughout the same. It is a principal object of my invention, therefore, to provide a means for removing the shackle from a hog as it moves along in suspended relation to an overhead conveyor in such a manner as to eliminate or at least substantially reduce the number of hams which are seriously damaged and/or lost for canning purposes because of the presence of excess quantities of blood in portions of the ham.

I have found in my examination of hams in the meat packing industry that the ham of the leg by means of which the hog is suspended more frequently has objectionable quantities of blood present therein than the other hams. I am satisfied that the presence of this blood can be attributed directly to the pumping action and/or rupture of the capsules around the joints as a direct result of the jerk imposed upon the leg of the ham when the shackle is torn free by means of such a hook member as is described above. The pumping action of the capsules surrounding the joints can be very definitely demonstrated by cutting away the meat from around the joint and inserting a hypodermic needle which is joined to a hose or tube and inserted into a container of colored fluid remote from the ham and then repeatedly pulling on the bones connected by the joint and releasing the same. When this is done, it can be readily seen that a very definite pumping action is created by such relative movement of the bones connected by the joint. Thus, it seems clear that when the pumping action takes place some of the blood which is normally retained within the bone is pumped out of the interior of the bone and into the capsules surrounding the joints of the ham and into the veins which extend through the meat of the ham. When the capsule is ruptured, this blood spreads throughout the ham and makes it unusable for canning purposes.

It is a general object of my invention to provide novel and improved hog handling apparatus which will substantially reduce the number of hams which must be rejected for canning purposes because of the presence of blood therein.

It is a more specific object of my invention to provide a novel means for removing the shackle from a suspended hog in such a manner that the capsules which surround the joints within the ham will not be ruptured and the blood therewithin will not be pumped outwardly through the seams of the ham to present an unsightly appearance when the ham has been cooked and is sliced.

Another object is to provide simple but highly efficient means for cooperating with the conventional conveyor upon which hogs are moved in a packing plant to enable the shackle to be removed from the hogs without submitting the hog to any jerking action.

These and other objects and advantages of the invention will more fully appear from the following description made in connection with the accompanying drawings, wherein like reference characters refer to the same or similar parts throughout the several views, and in which:

FIG. 1 is a partly schematic side elevational view of one embodiment of my invention;

FIG. 2 is a vertical sectional view taken along line 2—2 of FIG. 1;

FIG. 3 is a schematic view of a second form of my invention;

One embodiment of my invention may include, as shown in FIGS. 1-2, cooperating mechanism indicated generally by the letter M for cooperating with the conventional conveyor C of a packing plant. The hogs H are illustrated in FIG. 1 traveling along the conveyor C in the usual manner which is conventional within the meat packing plant. It will be noted that each of the hogs indicated by the letter H is suspended by one of its rear legs by a chain or shackle S which in turn is suspended by the conveyor C. The conveyor C as shown in FIG. 1 may be horizontal or as shown in FIG. 3 may be inclined in part or in its entirety. The conveyor mechanism C has the conventional means for causing the hogs H to progress along its length. This means has not been shown because it is well known and conventional in the art. A motor 5 may be utilized to power or drive the conveyor C.

My invention lies in the provision of the cooperating mechanism M in lieu of the hook member mounted on an eccentric as hereinbefore described to effect the removal of the shackle S from the rear leg of the hog H. As shown, this mechanism includes a frame 6 which has an endless bottom conveyor indicated generally by the numeral 7 mounted thereon and the sections of which are powered by a variable speed motor such as 8 and a belt such as indicated by the numeral 9. It will be noted that one section of the conveyor indicated by the numeral 10 is inclined upwardly in the direction of travel and a second section indicated by the numeral 11 is substantially horizontal. It will be readily understood that in lieu of the two separate sections 10 and 11 a single continuous conveyor may be utilized. It will be noted that the first section 10 of the conveyor 7 extends obliquely relative to the conveyor C and converges with the same in the direction of travel of the two conveyors. The conveyor 7, of course, is disposed directly beneath the conveyor C so that as the hogs are progressed along the latter, they will be engaged by the upwardly inclined section 10 of the conveyor 7. As the hogs H move along the conveyor C, the weight thereof will be gradually borne by the conveyor 7 and will be less and less supported by the conveyor C until the weight of the hog is borne completely by conveyor section 11. When the hog reaches the position opposite the employee indicated by the letter E, the entire weight of the hog is supported by the conveyor 7. At this point, the employee E finds it is an easy matter to release the chain or shackle S because the weight of the hog is no longer carried thereby. The employee E merely unhooks the chain and the hog is carried to the right as viewed in FIG. 1 until it reaches the discharge end at the extreme right of the section 11 at which point the hog passes into a chute 12 which terminates above the scalding tank 13. When the hog reaches the chute 12 it slides downwardly into the scalding tank through the action of gravity.

The speed of the conveyor section 10 is regulated in such a manner that the horizontal velocity thereof to the right is less than the horizontal velocity of the conveyor C in the same direction. Thus, the portion or section of the conveyor C which is disposed directly above the section 10 of the conveyor 7, and is indicated by the numeral 14, moves more rapidly to the right than does the section 10 of the conveyor 7 although the actual speed of the conveyor 7 may exceed that of the conveyor C. The section 11 of the conveyor 7 travels to the right at a greater velocity in the general direction of travel of the conveyor C than does the portion of the section C immediately thereabove. This relationship is advantageous because as the hog is progressed by the conveyor C the section 10 of the conveyor 7 will gradually assume the burden of the weight of the hog, but, because the hogs are slippery and the conveyors are generally wet and hence slippery, it is preferable that the horizontal velocity of the conveyor C exceed that of the conveyor section 10. It is important, however, that the reverse relationship exist between the horizontal velocities of section 11 and the section of the conveyor C immediately thereabove, for the greater velocity of section 11 causes the hog to catch up to the portion or section of the conveyor C immediately thereabove to cause the chain to slacken and thereby permit and facilitate the quick and easy removal of the chain or shackle S from the leg of the hog.

It will be noted that when the relationship between the velocities of the sections 10 and 11 of the conveyor 7 to the portions or sections of the conveyor C immediately thereabove is as hereinbefore described, the hog passes along the conveyor 7 rearward end first. While it does not matter which end of the hog enters the scalding taken first, this relationship is considered preferable because of the fact that the progressive movement of the hog H by the conveyor C aids in bringing the hogs onto the horizontal section 11 of the conveyor 7.

It will be readily understood, of course, that the velocities of the sections 10 and 11 of the conveyor 7 may be varied relative to the velocity of the conveyor C in such a manner that the horizontal velocity of the section 10 exceeds the horizontal velocity of the conveyor C. This, of course, would cause the hog to be disposed with its head foremost and the conveyor 10 would have the complete burden of bringing the hog onto the conveyor section 11. With this relationship, however, it would be important to have the velocity of the conveyor section 11 less than that of the conveyor section C, for this relationship would again cause the chain or shackle S to be slackened as the hog rides along the conveyor section 11.

Another form on my invention is disclosed schematically in FIG. 3. This form is designed for use in meat packing plants wherein the hogs travel down an inclined conveyor section 15 until they reach a horizontal section 16. In such an instance, the bottom conveyor 17 which corresponds to the bottom conveyor 7 may be horizontally disposed throughout its length. In such an arrangement, the section or portion of the bottom conveyor 17 which is disposed immediately below the conveyor section 15 would preferably have a horizontal velocity exceeding that of the section 15, while the section of the conveyor 17 disposed immediately below the conveyor section 16 would have a lesser horizontal velocity than that of the section 16. In such an arrangement, the hog would extend head foremost as shown in FIG. 3 and the shackle bearing the hog would be loosened shortly after the hog entered the area beneath the section 16 of the upper or overhead conveyor. In other words, the section 18 of the bottom conveyor would have a horizontal velocity less than that of the overhead conveyor section 16.

From the above it can be seen that through the use of my apparatus the shackle S can be quickly and easily removed from the leg of the hog without any damage thereto as a result thereof. I have found that the elimination of the jerking movement heretofore utilized in removing the shackle from the hog substantially reduces the damage to the hams and especially the ham of the leg by means of which the hog is suspended.

It will, of course, be understood that various changes may be made in the form, details, arrangement and proportions of the various parts without departing from the scope of my invention.

What is claimed is:

1. Hog handling apparatus comprising an overhead conveyor adapted to suspend and move shackled hogs along its length, a cooperating bottom conveyor means disposed beneath said overhead conveyor in position to cooperate therewith and traveling in the same general direction thereof, said bottom conveyor means including first and second independent conveyor sections, said overhead conveyor having a first conveyor section opposite the first section of the bottom conveyor means, said first sections being convergently oriented with respect to the direction of travel, said first conveyor sections having parallel velocity components, the relation of said velocity component of the first overhead conveyor section to said velocity component of the first bottom conveyor section being in a first ratio, said overhead conveyor also having a second conveyor section opposite the second section of the bottom conveyor means, said second conveyor sections being disposed adjacent the convergent ends of said first conveyor sections and receiving therefrom, said second conveyor sections also having substantially parallel velocity components, the relation of said velocity component of the second overhead section to said velocity component of the second bottom conveyor section being in a second ratio, one of said ratios being greater than unity and the other of said ratios being less than unity, the convergent ends of said first sections and said second sections being in sufficiently close proximity to cause the bottom conveyor means to take the weight of the shackled hog from the overhead conveyor, whereby to facilitate removal of the hogs from the overhead conveyor.

2. The structure defined in claim 1, wherein said velocity component of said first-mentioned overhead conveyor section is greater than the parallel velocity component of said first-mentioned bottom conveyor.

3. The structure defined in claim 1, wherein said velocity component of said first-mentioned overhead conveyor section is greater than the parallel velocity component of said first-mentioned bottom conveyor section, and the said velocity component of said second-mentioned overhead conveyor section is less than the said parallel velocity component of said second-mentioned bottom conveyor section.

References Cited in the file of this patent

UNITED STATES PATENTS

| | | |
|---|---|---|
| 801,523 | Hinchman et al. | Oct. 10, 1905 |
| 1,459,916 | McBride | June 26, 1923 |
| 1,580,745 | McBride | Apr. 13, 1926 |
| 1,703,829 | Pade | Feb. 25, 1929 |
| 2,381,044 | Franz | Aug. 7, 1945 |
| 2,651,401 | Vincent | Sept. 8, 1953 |
| 2,769,728 | Juvinall | Nov. 6, 1956 |
| 2,816,643 | Klamp | Dec. 17, 1957 |

FOREIGN PATENTS

| | | |
|---|---|---|
| 452,981 | Germany | Nov. 25, 1927 |